Figure 1:
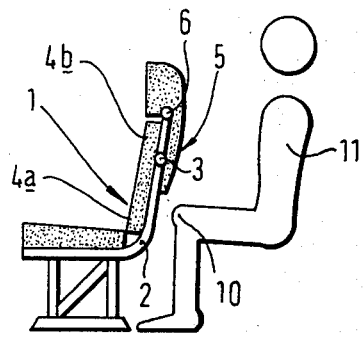

United States Patent [19]

Cunningham

[11] 4,335,918
[45] Jun. 22, 1982

[54] VEHICLE SAFETY SEAT

[75] Inventor: Douglas J. Cunningham, Lutterworth, England

[73] Assignee: BSG International Limited, Birmingham, England

[21] Appl. No.: 185,815

[22] Filed: Sep. 10, 1980

[51] Int. Cl.³ .............................................. B60R 21/10
[52] U.S. Cl. .................................... 297/216; 297/487; 280/751
[58] Field of Search ............... 297/216, 487, 488, 243; 280/751

[56] References Cited

U.S. PATENT DOCUMENTS

| | | | |
|---|---|---|---|
| 3,198,543 | 8/1965 | Presunka | 297/488 |
| 3,393,010 | 6/1968 | Steinberg | 297/488 |
| 3,877,749 | 4/1975 | Sakurai | 297/216 |
| 3,888,329 | 6/1975 | Monaghan | 297/488 |
| 3,924,874 | 12/1975 | Barenyi | 297/488 |
| 4,145,081 | 3/1979 | Withers | 297/216 |
| 4,190,288 | 2/1980 | Korger | 297/216 |
| 4,300,799 | 11/1981 | Cunningham | 297/487 |

Primary Examiner—Francis K. Zugel
Attorney, Agent, or Firm—Strimbeck, Davis & Soloway

[57] ABSTRACT

In a safety seat installation in a vehicle such as a bus or coach, where the seat is one of a longitudinal row of similar forward facing seats, the back is constructed in two portions 4 and 5 which are pivotally mounted at 3 and 6 respectively. In the event of sudden deceleration, for example in an accident, the rearwardly seated occupant's knees push the bottom of the lower seat back portion 4 forwards so that the top of this portion pushes the upper seat back portion 5 backwards into a position to restrain the rearwardly seated occupant's torso.

4 Claims, 5 Drawing Figures

VEHICLE SAFETY SEAT

This invention relates to a safety seat for installation in a vehicle such as a bus or coach, the seat being one of a longitudinal row of similar forward-facing seats and being adapted to restrain the forward movement of the occupant of the next rearward seat when the vehicle abruptly decelerates.

An adjustable passenger safety guard of the fixed type is known from, for example, Canadian Patent Specification No. 755505. In this type of restraint, the fixed position of a safety bar is adjustable to accommodate passengers of different sizes. When not required, the bar can be pivoted away from the occupants body to a storage position in which it appears or serves as an arm rest. Although such a device provides useful restraint and can be neatly stored, its disadvantage lies in the need for manual positioning, by the occupant, to provide safety restraint. This disadvantage may be overcome by using a safety bar which is automatically positioned before the occupant's torso in the event of the vehicle exceeding a pre-determined deceleration. Such a device is disclosed in U.K. Patent Specification No. 802,321. However, a disadvantage of the system disclosed in U.K. Pat. No. 802,321 is the time of response between, for example, the instant of vehicle impact and the positioning of the safety bar before the occupant's torso. In the latter system, the bar is positioned by a series of levers which are actuated only after the vehicle suspension has moved relative to the vehicle chassis when the vehicle decelerates. It is clearly most important, for safety reasons, to position a device in good time to restrain the forward momentum of a seated occupant when the vehicle has started to decelerate. Moreover, in the case of a device which is automatically positioned to provide occupant restraint under vehicle deceleration, it is important to avoid complexity so as to keep manufacturing costs to a minimum consistant with providing a safety seat having reliable operating characteristics.

Frontal impact tests (at 10 g) show that a dummy passenger collides with the next forward seat in two stages; for about the first 10 mS the knees of the dummy are pressed against the lower part of the back portion of such seat with a force approaching 4.4 KN when the vehicle and hence the seat are arrested; for the second 100 mS, approximately, the torso of the dummy impacts the upper part of the seat back. Seats may be so designed that frame arms to bend or yield to absorb some of the forward energy.

The invention accordingly provides a safety seat having a back portion which can be moved by knee pressure of the rearwardly seated occupant, due to the force exerted by said occupant's knees on exceeding a pre-determined vehicle deceleration, so as to deploy a flap which extends substantially from the lap to the upper part of the occupant's torso.

According to this solution, the flap is deployed directly following the rearwardly seated occupant's movement which projected from his own seat due to vehicle deceleration. The flap portion is, therefore, deployed in good time to provide the necessary safety restraint. Under normal driving conditions, the back portion and flap of the safety seat occupy positions providing a conventional form of back support for the occupant of said safety seat namely, the occupant who sits before the rearwardly seated occupant whose movements, under accident conditions, are to be restrained. The safety seat can be made of simple construction and this helps to reduce manufacturing costs.

The invention covers a vehicle fitted with a longitudinal row of safety seats, each as described above with respect to the present invention.

Figure 2:
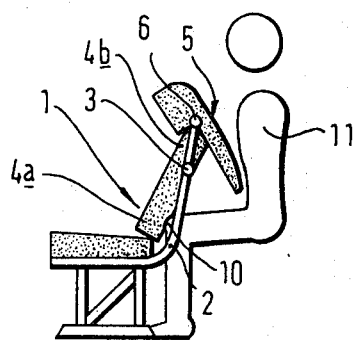
Figure 3:
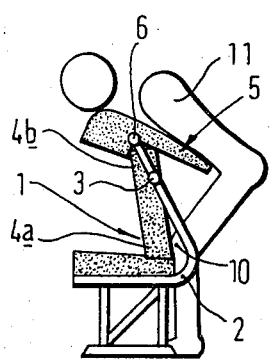
Figure 4:
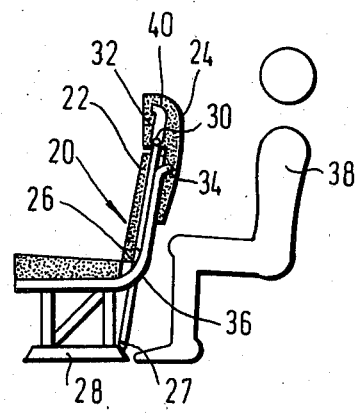
Figure 5:
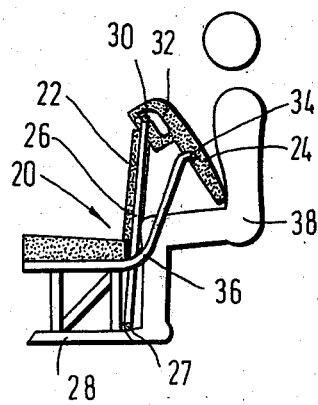

An embodiment of the invention will now be described with reference to the accompanying drawings, in which:

FIGS. 1 to 3 schematically illustrate elevational views of a safety seat in accordance with one embodiment of the invention and a rearwardly seated occupant, the Figures showing various stages in the operation of the safety seat under vehicle deceleration, and FIGS. 4 and 5 are views, corresponding to FIGS. 1 and 2, of another embodiment of the invention.

Referring to the FIGS. 1 to 3, a vehicle seat in accordance with the preferred embodiment of the invention, comprises a back portion 1 which is mounted on a seat frame 2 by pivots 3, one at each side of the back portion. The frame 2 includes a pair of upstanding members, one at each side of the back portion, which members may be the arms of an inverted U. A lower part 4a of the back portion 1 namely, the part below the pivot 3, is normally level with the knees 10 of an occupant 11 of the next rearward seat. The upper part 4b of the back portion 1 extends above the pivots 3. A flap 5 is mounted on the frame 3 by pivots y, one at each side. Pivots 6 may be parts of that portion of the U-shaped frame which links the arms or upstanding members. The flap 5 extends behind the upper part 4b of the back portion 1, with respect to the normal direction of travel of the vehicle. The back portion and the flap 5 are normally constrained in the position shown in FIG. 1, to act as a back support for the forwardly seated occupant, i.e. for the seat depicted in the drawings, by one or more shear pins or break-out latches (not shown) arranged to release the back portion 1 when a pre-determined force thereon is exceeded due to the knee pressure of the occupant 11.

FIGS. 2 and 3 show different stages in the operation of the safety seat under vehicle deceleration. In FIG. 2, the knees of the rearwardly seated occupant have forced the lower part 4a of the flap portion 1 forwardly of the frame arms 2 thereby causing the upper part 4b to act upon and to lever upwardly and rearwardly the flap portion 5. The flap portion then restrains the rearwardly seated occupant by his thighs, the flap portion extending from the occupant's lap to his upper torso. Self-locking stays (not shown) limit the rearward movement of the back flap. Their self-locking action prevents re-folding.

FIG. 3 shows how the seat frame 2 yields to absorb the impact of the occupant's torso. Suitable choice of materials for the frame 2 enables some of the energy of the occupant's forward motion to be absorbed in the event of an accident. The back and lap portions may normally be fixed in the position shown in FIG. 1 by a shear pin or break-out latch adjusted to release the back portion when the vehicle deceleration exceeds 1.5 g with an occupant of average physical dimensions.

FIGS. 4 and 5 show an alternative to the safety seat illustrated in FIGS. 1 to 3. The alternative seat 20 has a back portion 22 and a flap 24, the upper end of which serves as a head rest. The back portion 22 is mounted on a frame 26 which is pivotally attached at 27 to the back of a seat subframe 28 which is secured to the floor of the vehicle. The upper end of the frame 26 carries a cam follower 30 which engages in a slot 32 in the flap 24. The flap 24 is also pivotally mounted at 34 on a seat frame 36 which is fixed to the subframe 28.

Thus, in contrast to the seat illustrated in FIGS. 1 to 3, the seat back 22 pivots about an axis located below the knees of an occupant 38 of the next rearward seat. The back frame 26 is connected to the seat frame 36 by one or more sheer pins, break out latches or the like arranged to release the back frame 26, and the back portion 22 mounted thereon, when a pre-determined force is exerted by the knees of the occupant 38. When the top of the frame 26 moves forwards, the cam follower 30 travels along the slot 32 and the flap 24 is tilted to the position shown in FIG. 5.

I claim:

1. A safety seat for a vehicle comprising a frame, a back portion mounted for pivotal movement relative to the frame so as to be movable forwardly by knee pressure of a rearwardly seated occupant due to the force exerted by said occupant's knees when a pre-determined vehicle deceleration is exceeded, and a flap pivotally mounted on the frame and engaging with the back portion so that, when said pre-determined vehicle deceleration is exceeded and said back portion is pivoted forwardly said flap portion is deployed so as to confront the part of said occupant's torso above the lap.

2. A safety seat according to claim 1, wherein the frame is constructed of material such that it deforms to absorb part of the energy of the rearwardly seated occupant's forward movement after the flap has been deployed.

3. A safety seat according to claim 1, wherein the back portion is mounted on the frame for pivotal movement about an axis located above the normal knee level of the rearwardly seated occupant and, a flap portion is mounted on the frame above the back portion so as to extend behind the back portion with respect to the normal direction of travel of the vehicle.

4. A safety seat according to claim 1, wherein the back portion is pivotally mounted for movement about an axis located below the normal knee level of the rearwardly seated occupant, a cam follower mounted on the seat back engaging in a slot in the flap.

* * * * *